Sept. 20, 1927.  H. J. BAUMANN ET AL  1,643,281
AWNING OPERATING DEVICE
Filed Jan. 6, 1927
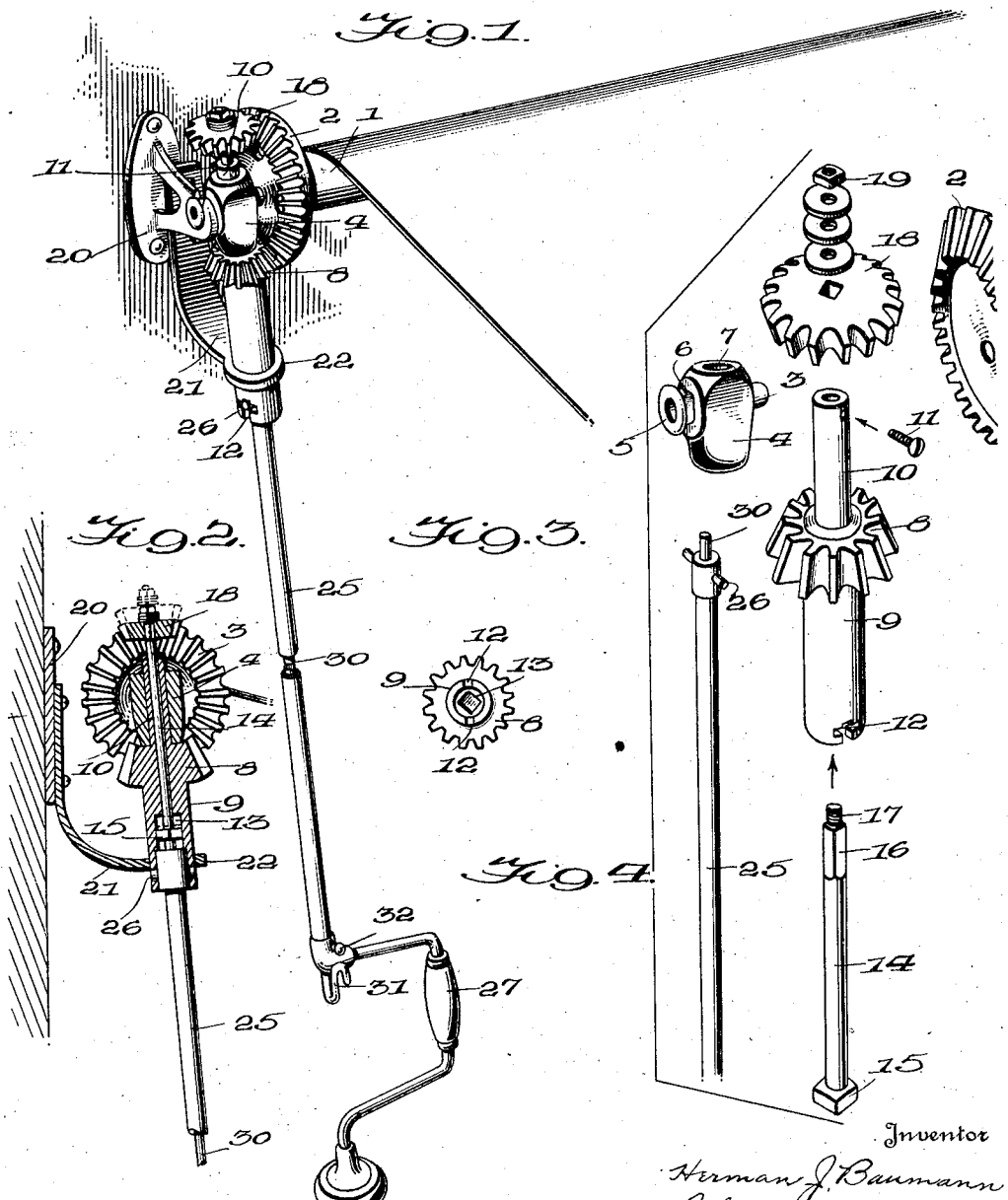

Patented Sept. 20, 1927.

1,643,281

UNITED STATES PATENT OFFICE.

HERMAN J. BAUMANN AND JOHN F. BAUMANN, OF WEST NEW YORK, NEW JERSEY.

AWNING-OPERATING DEVICE.

Application filed January 6, 1927. Serial No. 159,335.

The invention relates to an operating device for roller awnings and has for its object to provide a simple and efficient form of operating gearing located adjacent to one end of the awning roller, associated with a removable extension handle by means of which the roller is operated to raise and lower the awning, the driving gear carrying a detent movable axially thereof to engage and disengage the driven gear and the extension handle is provided with a slidable rod to control the movement of the detent to lock or release the driven gear, after the removable handle has been engaged with the driving gear.

The invention is illustrated in the accompanying drawings, in which:—

Fig. 1 is a perspective view of the operating device shown applied to the end of an awning roller.

Fig. 2 is a vertical longitudinal section.

Fig. 3 is a bottom plan view of the driving gear.

Fig. 4 is an exploded perspective of the several elements of the device.

Referring to the drawings, 1 indicates the awning roller, which may be of the usual form of hollow tubing, which is revolved to roll and unroll the awning fabric, as will be understood. Fixed to one end of the roller 1 is a bevel-gear 2 by means of which the rotation of the roller is effected. The end of the roller is journaled on a pintle 3 formed integrally with a bearing block 4, which latter is provided with a flanged boss 5 on its opposite face, which engages a suspension bracket 20 of the usual form.

The bearing block 4 has a longitudinal bore 7 in which is journaled the upper reduced end 10 of the hollow hub 9 of the driving bevel-gear 8, which meshes with gear 4 on the roller 1. The driving gear 8 is secured in freely rotatable relation within the bearing block 4 by means of a screw or pin 11, which passes through an opening in the upper end of the reduced section 10 of the hub. Said hub 9 is provided with a longitudinal bore, the lower portion of which constitutes a squared socket 13 to receive the squared end 15 of the rod or bolt 14, which is slidable in the bore, but is locked against rotation independently of the gear. The upper end of the rod 14 has a squared section 16 above which is a screw-threaded portion 17.

A detent 18, which preferably takes the form of a bevel-gear, has a squared central opening which engages the squared end 16 of the rod 14 and is locked to the shaft by nut 19, so that, when the rod 14 is moved axially of the bore in the hub of the driving gear 8, the gear-like detent 18 is moved into and out of engagement with the teeth on the bevel-gear 2.

A supplemental bracket 21, which is preferably bolted to bracket 20, is provided with an eye 22 in its end through which the lower end of hub 9 extends, said bracket 21 serving as a guide to hold the hub of the driving gear against lateral movement in any direction.

The lower end of the hub 9 is provided with oppositely disposed bayonet slots 12 adapted to be engaged by a cross pin 26 on the upper end of an operating handle 25, the lower end of said handle preferably being provided with an operating crank 27 by means of which the handle and the driving gear may be readily rotated, when the handle is engaged with the hub of the driving gear in the manner shown in Figs. 1 and 2. The handle 25, which may be conveniently made of a section of pipe, has slidably mounted therein a rod 30, the upper end of which is adapted to contact the end of the rod or bolt 14, when the handle is engaged with the hub of the driving gear 8, to elevate rod 14 and the locking detent 18 carried thereby and disengage said detent from gear wheel 2, as indicated in Fig. 2. The lower end of rod 30 is provided with a hook 31 adapted to be engaged with a stud 32 carried by the handle 25, whereby the rod 30 is locked in its advanced position to hold the detent 18 out of engagement with the gear 2 and permit the latter to be rotated.

The operation of the device is as follows: When the awning is either in its extended or rolled relation, the parts occupy the relative positions shown in Figs. 1 and 2, with the detent 18 engaging the driven gear 2 on the end of the roller 1. As this detent is locked against independent rotation with respect to the driving gear 8 by means of the squared head 15 of bolt 14 engaging the socket 13 in the hub of the driven gear, it is apparent that the roller 1 will be locked against rotation in either direction. When it is desired to roll or unroll the awning, the handle 25 is engaged by the operator with the socketed end of the hub 9 of the driving gear 8, this engagement being effected by means of the bayonet joint aforesaid. The operator then moves the rod 30 carried in the handle 25 upwardly, thereby elevating rod 14 and detent 18 until the latter is disengaged from gear 2, so that said gear is free to be operated by rotation of driving gear 8 by means of the crank handle 27 on the operator's rod. In order to permit the operator to use both hands, the hook 31 on the end of rod 30 is engaged with the stud 32, thereby locking the detent 18 in its elevated or disengaged position. After the awning has been rolled or unrolled to the desired extent, the hook end 31 of rod 30 is disengaged from stud 32 and said rod is moved downwardly in the handle 25 a short distance, thereby permitting the rod 14 and detent 18 to be moved downwardly until the latter engages the gear wheel 2 and securely locks the same against rotation. The operating handle 25 is then disengaged from hub 9.

The device, as described, is particularly effective, not only in respect of the simplicity of construction and operation thereof, but as a safeguard against the tampering with the awning and its operating device by mischievous persons, as the operating devices per se are located out of reach, except by means of the removable operating handle, the removal of which handle effects the automatic locking of the awning roller.

What we claim is:

1. An awning operating device, comprising a bevel-gear fast to the end of the awning roller, a bearing block forming a bearing and support for the end of the roller, a driven bevel-gear having a hollow hub journaled in said bearing block and meshing with the first gear, a rod slidable axially of the hub and fixed against independent rotation therein, a detent fixed on the end of said rod adapted to engage and lock the first bevel-gear against rotation, and removable extension means to engage and rotate the driving bevel-gear and shift the rod to disengage the detent from the first bevel-gear.

2. An awning operating device, comprising a bevel-gear fast to the end of the awning roller, a bearing block forming a bearing and support for the end of the roller, a driven bevel-gear having a hollow hub journaled in said bearing block and meshing with the first gear, a rod slidable axially of the hub and fixed against independent rotation therein, a locking bevel-gear fixed on the end of said rod and adapted to engage and hold the first bevel-gear against rotation, and removable extension means to engage and rotate the driving bevel-gear and shift the rod to disengage the detent from the first bevel-gear.

3. An awning operating device, comprising a bevel-gear fast to the end of the awning roller, a bearing block forming a bearing and support for the end of the roller, a driven bevel-gear having a hollow hub journaled in said bearing block and meshing with the first gear, a rod slidable axially of the hub and fixed against independent rotation therein, a detent fixed on the end of said rod adapted to engage and lock the first bevel-gear against rotation, a hollow extension handle removably engaging the hub of the driving gear to rotate said gear, and a rod slidable in said handle to engage the detent carrying rod and move the detent from engagement with the first gear.

4. An awning operating device, comprising a bevel-gear fast to the end of the awning roller, a bearing block forming a bearing and support for the end of the roller, a driven bevel-gear having a hollow hub journaled in said bearing block and meshing with the first gear, a rod slidable axially of the hub and fixed against independent rotation therein, a detent fixed on the end of said rod adapted to engage and lock the first bevel-gear against rotation, a hollow cranked extension handle removably engaging the hub of the driving gear to rotate said gear, and a rod slidable in said handle to engage the detent carrying rod and move the detent from engagement with the first gear.

5. An awning operating device, comprising a bevel-gear fast to the end of the awning roller, a bearing block forming a bearing and support for the end of the roller, a driven bevel-gear having a hollow hub journaled in said bearing block and meshing with the first gear, a rod slidable axially of the hub and fixed against independent rotation therein, a detent fixed on the end of said rod adapted to engage and lock the first bevel-gear against rotation, a hollow cranked extension handle having a bayonet joint connection with the hub of the driving gear, and a rod slidable in said handle to engage the detent carrying rod and move the detent from engagement with the first gear.

6. An awning operating device, comprising a bevel-gear fast to the end of the awning roller, a bearing block forming a bearing and support for the end of the roller, a driven bevel-gear having a hollow hub journaled in said bearing block and meshing with the first gear, a rod slidable axially of the hub and fixed against independent rotation therein, a detent fixed on the end of said rod adapted to engage and lock the first bevel-gear against rotation, a hollow cranked extension handle having a bayonet joint connection with the hub of the driving gear, a rod slidable in said handle to engage the detent carrying rod and move the detent from engagement with the first gear, and means to lock the slidable rod to said handle.

In testimony whereof we affix our signatures.

HERMAN J. BAUMANN.
JOHN F. BAUMANN.